United States Patent
Okamura (10) Patent No.: US 11,548,406 B2
(45) Date of Patent: Jan. 10, 2023

(54) DUCT OPENING PORTION STRUCTURE

(71) Applicant: TOYOTA JIDOSHA KABUSHIKI KAISHA, Toyota (JP)

(72) Inventor: Masatoshi Okamura, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1011 days.

(21) Appl. No.: 16/267,751

(22) Filed: Feb. 5, 2019

(65) Prior Publication Data

US 2019/0248253 A1 Aug. 15, 2019

(30) Foreign Application Priority Data

Feb. 13, 2018 (JP) .............................. JP2018-023045

(51) Int. Cl.
*H01M 10/613* (2014.01)
*B60L 58/26* (2019.01)
(Continued)

(52) U.S. Cl.
CPC .......... *B60L 58/26* (2019.02); *B01D 46/0005* (2013.01); *H01M 10/613* (2015.04); (Continued)

(58) Field of Classification Search
CPC ................ B60L 58/26; B01D 46/0005; B01D 2271/022; B01D 2271/027; B01D 2279/45; H01M 10/613; H01M 10/625; H01M 10/655; H01M 10/6561; H01M 10/6563; H01M 10/663; H01M 50/20; H01M 2220/20; B60Y 2200/91; B60Y 2306/05; B60K 2001/005; B60K 1/00; Y02E 60/10; Y02T 10/70; Y02T 10/7072; Y02T 90/14

See application file for complete search history.

(56) References Cited

U.S. PATENT DOCUMENTS

| 2009/0173471 | A1 | 7/2009 | Sakamoto |
| 2016/0243919 | A1 | 8/2016 | Yamanaka et al. |
| 2016/0268659 | A1* | 9/2016 | Nagamine .......... H01M 10/625 |

FOREIGN PATENT DOCUMENTS

| JP | S58-104319 U | 7/1983 |
| JP | H11-348532 A | 12/1999 |

(Continued)

OTHER PUBLICATIONS

Translation of Jun. 29, 2021 Office Action issued in Japanese Patent Application No. 2018-023045.

*Primary Examiner* — Muhammad S Siddiquee
(74) *Attorney, Agent, or Firm* — Oliff PLC (57) ABSTRACT

A duct opening portion structure includes an air intake duct; a filter that is disposed in an opening portion at an air introduction side of the air intake duct; and a bezel that is disposed in the opening portion at the air introduction side of the air intake duct, the bezel being configured to support the filter. The bezel is attached to a vehicle body-side member, and the bezel includes a rib including a support portion configured to support the filter. The filter is attached to the support portion. The rib is provided with an extension portion having a length that allows the extension portion to be directly or indirectly pressed against a seal member provided at an edge of the opening portion in a state where the bezel is attached to the vehicle body-side member.

4 Claims, 4 Drawing Sheets

(51) Int. Cl.
*B01D 46/00* (2022.01)
*H01M 10/625* (2014.01)
*H01M 10/6561* (2014.01)
*H01M 10/655* (2014.01)
*H01M 10/6563* (2014.01)
*H01M 10/663* (2014.01)
*H01M 50/20* (2021.01)

(52) U.S. Cl.
CPC ....... *H01M 10/625* (2015.04); *H01M 10/655* (2015.04); *H01M 10/6561* (2015.04); *H01M 10/6563* (2015.04); *H01M 10/663* (2015.04); *H01M 50/20* (2021.01); *B01D 2271/022* (2013.01); *B01D 2271/027* (2013.01); *B01D 2279/45* (2013.01); *B60Y 2200/91* (2013.01); *B60Y 2306/05* (2013.01); *H01M 2220/20* (2013.01)

(56) References Cited

FOREIGN PATENT DOCUMENTS

| | | |
|---|---|---|
| JP | 2009-161062 A | 7/2009 |
| JP | 2010-154603 A | 7/2010 |
| JP | 2010-285070 A | 12/2010 |
| JP | 2016-153279 A | 8/2016 |
| JP | 2016-165949 A | 9/2016 |
| JP | 2017-190094 A | 10/2017 |

\* cited by examiner

DUCT OPENING PORTION STRUCTURE

INCORPORATION BY REFERENCE

The disclosure of Japanese Patent Application No. 2018-023045 filed on Feb. 13, 2018 including the specification, drawings and abstract is incorporated herein by reference in its entirety.

BACKGROUND

1. Technical Field

The disclosure relates to a duct opening portion structure. In particular, the disclosure relates to a measure for increasing an opening area of a duct opening from which air for cooling an in-vehicle object to be cooled is introduced.

2. Description of Related Art

As disclosed in Japanese Patent Application Publication No. 2010-285070 (JP 2010-285070 A), each of a hybrid vehicle and an electric vehicle has a cooling structure for restraining an increase in a temperature of a battery (an electric storage cell) that supplies electricity to an electric motor as a drive power source for traveling.

As such a cooling structure, an air intake duct is generally provided to deliver air in a vehicle cabin toward a battery in a battery housing box that is disposed in a lower portion of the vehicle. That is, one end (at an air introduction side) of the air intake duct is opened to the inside of the vehicle cabin, and the other end thereof is connected to the battery housing box. In addition, a blower is disposed in an intermediate portion of an air intake path. When the blower is actuated, an air stream is generated in the air intake duct. Thus, the air in the vehicle cabin is delivered to the inside of the battery housing box through the intake duct, and thus, the air cools the battery.

Figure 4:
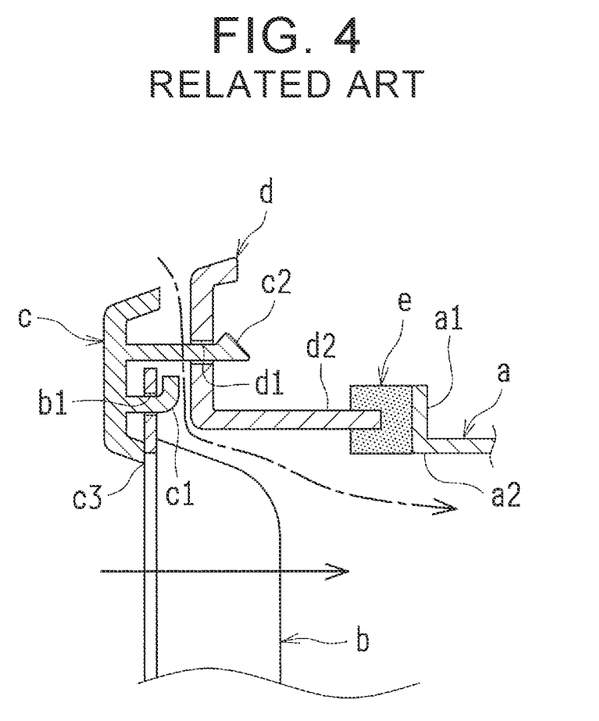
FIG. 4 is a view of a sectional structure of an upper portion of an ordinary duct opening portion in related art.

FIG. 4 shows a sectional structure of an upper portion of an ordinary duct opening portion in related art (i.e., an opening portion at the air introduction side). As shown in FIG. 4, an opening portion of an air intake duct "a" is provided with a filter "b" that prevents an inflow of foreign substances (dust and the like); a bezel "c" that supports the filter "b" and serves as a decorative member in the duct opening portion; a garnish "d" through which the bezel "c" is supported by a vehicle body-side member (not shown); and a sponge (synthetic resin foam) "e" that provides sealing between the garnish "d" and the air intake duct "a".

More specifically, the bezel "c" is formed as a frame body that extends along the shape of an edge of an opening portion of the air intake duct "a". A back surface (a surface facing toward a right side in FIG. 4) of the bezel "c" is provided with filter locking projections "c1" that are provided at intervals along a circumferential direction at an inner side (a lower side in FIG. 4) of the back surface; and garnish locking projections "c2" that are provided at intervals along the circumferential direction at an outer side (an upper side in FIG. 4) of the back surface. Openings "b1" are provided at an outer edge of the filter "b", and each of the openings "b1" is locked to the corresponding filter locking projection "c1". The garnish "d" is provided with openings "d1", and each of the garnish locking projections "c2" is locked to the corresponding opening "d1". In addition, the sponge "e" is bonded to a flange "a1" that is provided at the edge of the opening portion of the air intake duct "a". The garnish "d" is provided with an extension portion "d2" that extends toward the air intake duct "a". A distal end of the extension portion "d2" presses the sponge "e", and thus, the sponge provides sealing between the garnish "d" and the air intake duct "a".

With this structure, when the blower (not shown) is actuated, the air in the vehicle cabin flows through the filter "b" and is cleaned by the filter "b" as indicated by a solid arrow in FIG. 4. Then, the cleaned air is introduced into the air intake duct "a".

SUMMARY

The required function and performance of the duct opening portion are as follows.

The filter "b" should be replaceable (that is, a filter replacement function is required). In this case, it is required that the filter "b" and the bezel "c" should be detached together to prevent falling of dust from the filter "b". Next, in order to secure a sufficient amount of air to be delivered toward the battery, it is required that a large opening area at the air introduction side should be secured (that is, air amount increase performance is required). Furthermore, it is required that all the air to be introduced into the air intake duct "a" should flow through the filter "b" (that is, air cleaning performance is required).

In the duct opening portion structure shown in FIG. 4, the garnish locking projections "c2" of the bezel "c" can be detached from the openings "d1" of the garnish "d", and therefore, the filter replacement function is secured. Meanwhile, there is a possibility that the air amount increase performance and the air cleaning performance are not sufficiently secured.

More specifically, in the bezel "c", both of the filter locking projections "c1" and the garnish locking projections "c2" are provided in a height direction of the bezel "c". In other words, a region to which the filter "b" is locked and a region that is locked to the garnish "d" are arranged in an up-down direction. Thus, an inner edge "c3" of the bezel "c" may be located inward of an inner edge "a2" of the air intake duct "a" (i.e., the inner edge "c3" may be located below the inner edge "a2" in FIG. 4). In this case, the opening area at the air introduction side is reduced. As a result, there is a possibility that the maximum air amount increase performance is not secured.

In addition, no special sealing structure is provided between the bezel "c" and the garnish "d". Thus, in the case where at least one of these members "c", "d" is warped, or there are variations in positions at which the members "c", "d" are fitted, a clearance may be caused between these members "c", "d". In such a case, as indicated by an alternate long and short dash arrow in FIG. 4, the air that has not flowed through the filter "b" (the air that has flowed between the bezel "c" and the garnish "d") may be introduced into the air intake duct "a". As a result, there is a possibility that the maximum air cleaning performance is not secured.

The disclosure provides a duct opening portion structure that makes it possible to secure the maximum air amount increase performance and the maximum air cleaning performance.

An aspect of the disclosure relates to a duct opening portion structure that is configured to introduce air for cooling an in-vehicle object to be cooled. The duct opening portion structure includes an air intake duct; a filter that is disposed in an opening portion at an air introduction side of the air intake duct; and a bezel that is disposed in the opening portion at the air introduction side of the air intake duct, the bezel being configured to support the filter. The bezel is attached to a vehicle body-side member, and the bezel includes a rib including a support portion configured to support the filter. The filter is attached to the support portion. The rib is provided with an extension portion having a length that allows the extension portion to be directly or indirectly pressed against a seal member provided at an edge of the opening portion in a state where the bezel is attached to the vehicle body-side member.

With the above-described configuration, the filter and the bezel are disposed in the opening portion at the air introduction side of the air intake duct. In the state where the bezel is attached to the vehicle body-side member, the filter is attached to the support portion of the bezel, and the extension portion of the rib provided in the bezel is directly or indirectly pressed against the seal member that is provided at the edge of the opening portion at the air introduction side of the air intake duct. That is, the rib of the bezel includes a functional portion to which the filter is attached; and a sealing functional portion that provides sealing between the rib and the edge of the opening portion when the rib is pressed against the seal member. Thus, a width dimension (a dimension for covering the edge of the opening portion at the air introduction side of the air intake duct) of the bezel can be made small. As a result, a large opening area at the air introduction side (a large opening area of the duct opening portion) can be secured, and thus, sufficient (maximum) air amount increase performance can be secured. Meanwhile, in the related art, the bezel is locked to the garnish, and no special sealing structure is provided between the bezel and the garnish. Thus, the air that has flowed between the bezel and the garnish (the air that has not flowed through the filter) may be introduced into the air intake duct. However, in the above-described configuration, the extension portion of the bezel is pressed against the seal member without providing the garnish between the extension portion of the bezel and the seal member. Thus, all the air to be introduced into the air intake duct flows through the filter, and thus, sufficient air cleaning performance can be secured.

The support portion of the bezel may be a locking projection to which an opening provided in the filter is locked.

With the above-described configuration, in an operation of replacing the filter, the bezel and the filter are initially detached together from the vehicle body-side member, and the filter is detached from the locking projection that is the support portion in the bezel. Thereafter, the locking projection of the bezel is locked to the opening of the new filter, and the bezel, which is locked to the filter, is attached to the vehicle body-side member. Thus, the filter replacement function is maintained.

The filter may be welded to the support portion of the bezel. The filter may be bonded to the support portion of the bezel.

With any of the above-described configurations, in the operation of replacing the filter, the filter and the bezel are replaced integrally (i.e., the filter and the bezel that are integrated with each other are replaced), and thus, an operation of detaching the bezel from the filter is no longer necessary. Thus, the replacement operation can be simplified.

The extension portion of the rib may be pressed against the seal member in an extending direction in which the extension portion extends. The extension portion of the rib may be pressed against the seal member in a direction that is orthogonal to an extending direction in which the extension portion extends.

With any of the above-described configurations, by pressing the extension portion of the rib against the seal member, a sealing property between the bezel and the air intake duct can be secured, and all the air to be introduced into the air intake duct flows through the filter. Thus, the sufficient air cleaning performance can be secured.

In the above-described aspect of the disclosure, the rib provided in the bezel configured to support the filter is provided with the extension portion having the length that allows the extension portion to be directly or indirectly pressed against the seal member provided at the edge of the opening portion of the air intake duct in the state where the bezel is attached to the vehicle body-side member. Thus, the width dimension (the dimension for covering the edge of the opening portion at the air introduction side of the air intake duct) of the bezel can be made small. Thus, the large opening area at the air introduction side can be secured, and the sufficient air amount increase performance can be secured. In addition, since the extension portion of the bezel is pressed against the seal member, all the air to be introduced into the air intake duct flows through the filter. Thus, the sufficient air cleaning performance can be secured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will be hereinafter provided on an embodiment of the disclosure with reference to the drawings. In the embodiment, a description will be provided on the case where the disclosure is applied as a duct opening portion structure to introduce air for cooling a battery (an object to be cooled) provided in an electric vehicle.

Figure 1:
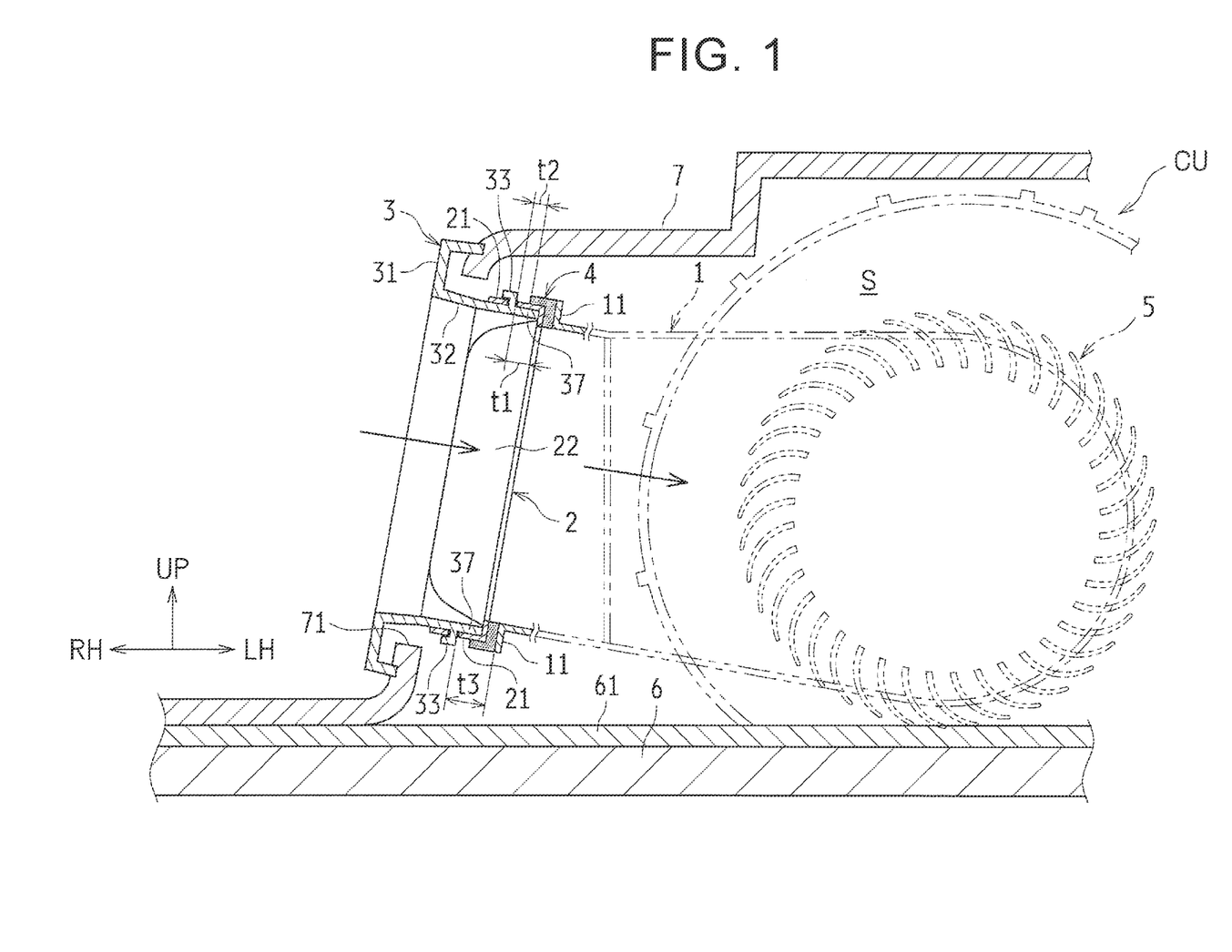
FIG. 1 is a sectional view of a duct opening portion structure according to an embodiment.
Figure 2:
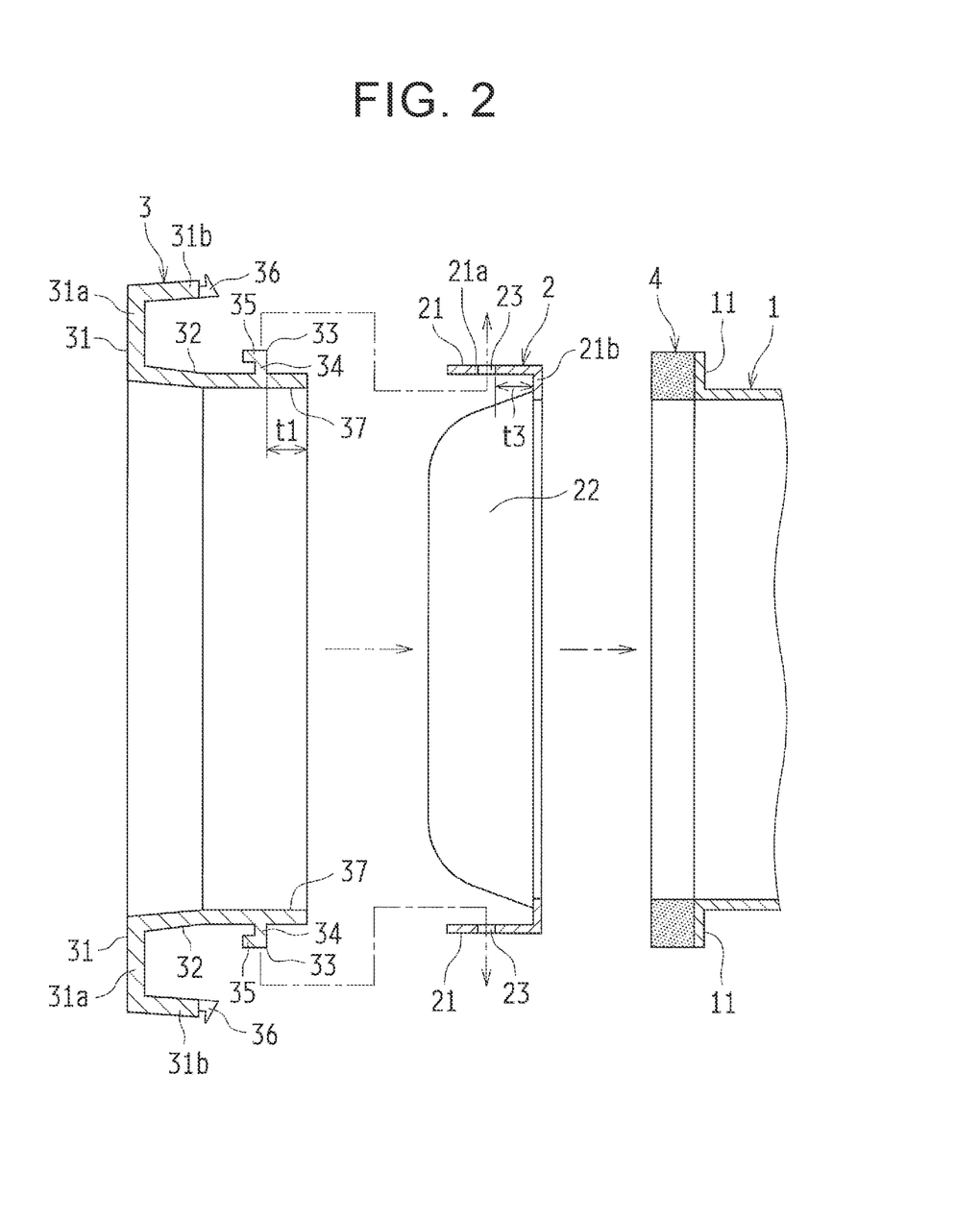
FIG. 2 is an exploded view showing an air intake duct, a filter, and a bezel.

FIG. 1 is a sectional view of the duct opening portion structure according to the embodiment. FIG. 2 is an exploded view showing an air intake duct 1, a filter 2, and a bezel 3. Here, FIG. 1 is a sectional view of a lower portion below a right front seat in a vehicle cabin, and an arrow UP, an arrow LH, and an arrow RH in FIG. 1 respectively indicate an upward direction, a vehicle body leftward direction, and a vehicle body rightward direction.

A sound absorbing material 61 is bonded to an upper surface of a floor panel 6 that constitutes a floor surface of the vehicle cabin. A cooling unit housing space S is provided between the sound absorbing material 61 and a floor member (for example, a hard floor carpet; a vehicle body-side member) 7 that is disposed above the sound absorbing material 61. In addition, a cooling unit CU configured to cool a battery (not shown) is housed in the cooling unit housing space S.

The cooling unit is configured to include the air intake duct 1, the filter 2, the bezel 3, a sponge (a seal member) 4, and a blower 5.

The floor member 7 is provided with an opening portion 71 that is opened toward an outer side (a left side in FIG. 1) in a vehicle width direction, and one end (at an air introduction side) of the air intake duct 1 that is housed in the cooling unit housing space S is opened toward the opening portion 71.

The air intake duct 1 delivers the air in the vehicle cabin toward the battery in a battery housing box that is not shown and disposed in a lower portion of the vehicle. More specifically, the air intake duct 1 extends from the end on the air introduction side toward an inner side in the vehicle width direction, then extends toward a rear side of the vehicle body, and is connected to the battery housing box. The blower 5 is disposed in an intermediate portion of an air intake path that is formed by the air intake duct 1. When the blower 5 is actuated, an air stream is generated in the air intake duct 1. Thus, the air in the vehicle cabin is delivered to the inside of the battery housing box through the air intake duct 1 (see arrows in FIG. 1) and the air cools the battery.

In addition, a flange 11 that extends toward an outer side is provided at the end at the air introduction side of the air intake duct 1. The sponge 4 in a shape of a frame is bonded to an entire end surface (a surface facing the outer side in the vehicle width direction) of the flange 11 along a circumferential direction of the flange 11. In a state where an external force is not applied to the sponge 4 (i.e., a state where an extension portion 37 of the bezel 3 is not pressed against the sponge 4 as will be described below), the sponge 4 has a substantially rectangular sectional shape (see FIG. 2).

The filter 2 is configured to prevent an inflow of foreign substances (dust and the like) to the inside of the air intake duct 1 and includes a frame 21 in the shape of a frame and an element 22 that is formed integrally with the frame 21 and disposed inside the frame 21.

The frame 21 of the filter 2 includes a horizontal portion 21a (see FIG. 2) that extends in a substantially horizontal direction; and a perpendicular portion 21b that extends inward (toward the air intake path-side) by a specified dimension (i.e., by a specified length) from an end edge at the air intake duct 1-side of the horizontal portion 21a. In the horizontal portion 21a of the frame 21, openings 23 are provided at positions at specified intervals in the circumferential direction. Each of the openings 23 extends through the horizontal portion 21a along a vertical direction. Each of the openings 23 is used as a locking portion of the filter 2, which is locked to the bezel 3.

The bezel 3 is formed as a frame body that extends along the shape of an edge of an opening portion of the air intake duct 1. The bezel 3 includes a bezel body 31 and a rib 32.

The bezel body 31 includes a vertical portion 31a that extends along the substantially vertical direction; and a horizontal portion 31b that extends in the substantially horizontal direction from an outer edge of the vertical portion 31a toward the air intake duct 1. The bezel body 31 forms a front end portion of a duct opening portion, and thus functions as a decorative member of the duct opening portion.

The rib 32 is continuous with an inner edge (an end edge at the air intake path-side) of the vertical portion 31a of the bezel body 31, and extends in the substantially horizontal direction from the inner edge of the vertical portion 31a toward the air intake duct 1.

On an outer surface of the rib 32, locking projections (support portions) 33 are provided so as to project at positions at specified intervals in the circumferential direction. Each of these locking projections 33 includes a perpendicular portion 34 that extends perpendicularly from the outer surface of the rib 32; and a horizontal portion 35 that extends from an outer end of the perpendicular portion 34 toward a side opposite to the air intake duct 1. The positions where these locking projections 33 are disposed correspond to the positions where the openings 23 are provided. Each of the openings 23 is provided in the horizontal portion 21a of the frame 21 of the filter 2. Each of the locking projections 33 of the rib 32 is inserted in the corresponding opening 23 provided in the frame 21. Thus, the filter 2 is detachably locked to the bezel 3.

In the horizontal portion 31b of the bezel body 31 of the bezel 3, locking portions 36 are provided at positions at specified intervals in the circumferential direction thereof (see FIG. 2). Each of the locking portions 36 is locked to the floor member 7. In a locking structure including the locking portions 36, for example, openings (not shown) are provided at positions at the specified intervals along an edge of the opening portion 71 of the floor member 7, and each of the locking portions 36 is inserted in the corresponding opening. Thus, the bezel 3 is locked to the floor member 7.

Features of the embodiment will be described. The rib 32 of the bezel 3 is provided with the extension portion 37 that further extends toward the air intake duct 1 from the positions where the locking projections 33 are provided. In a state where the bezel 3 is locked to the floor member 7, the extension portion 37 has a length (a dimension t1 in FIG. 1 and FIG. 2) that allows the extension portion 37 to be pressed against the sponge 4 (in other words, to be pressed against a surface of the sponge 4 on the side opposite to the air intake duct 1 (i.e., a surface of the sponge 4, which is opposite to a surface facing the air intake duct 1)). More specifically, the dimension t1 of the extension portion 37 is set to be longer than a clearance dimension (a dimension t2 in FIG. 1) between each of the locking projections 33 and the sponge 4 (the sponge 4 in a state before being deformed) and shorter than a clearance dimension (a dimension t3 in FIG. 1) between each of the locking projections 33 and the flange 11 of the air intake duct 1, in the state where the bezel 3 is locked to the floor member 7.

In addition, a clearance dimension (the dimension t3 in FIG. 2) between each of the openings 23 in the horizontal portion 21a of the frame 21 of the filter 2 and the perpendicular portion 21b of the frame 21 substantially matches the dimension t1 of the extension portion 37 (t3=t1). Thus, as shown in FIG. 1, in a state where the filter 2 is locked to the bezel 3, a distal end of the extension portion 37 is brought into contact with the perpendicular portion 21b of the frame 21 of the filter 2.

Due to the above-described dimensional relationships among the portions, as shown in FIG. 1, in the state where the bezel 3 is locked to the floor member 7, the distal end of the extension portion 37 is pressed against the sponge 4 via the filter 2 (more specifically, via the perpendicular portion 21b of the frame 21 of the filter 2), in other words, the extension portion 37 of the bezel 3 is indirectly pressed against the sponge 4. Thus, the sponge 4 is partially deformed in a compressed direction and thus, the sponge 4 provides sealing among the bezel 3, the filter 2, and the air intake duct 1 in an airtight manner. In addition, in the embodiment, a dimension (for example, a dimension in an up-down direction in FIG. 1) of an outer edge of the frame 21 of the filter 2 is set to be slightly smaller than a dimension (similarly, a dimension in the up-down direction in FIG. 1) of an outer edge of the sponge 4. Thus, only an inner side (the air intake path-side) of a sectional shape of the sponge 4 is deformed in the compressed direction.

As described above, the rib 32 of the bezel 3 includes a functional portion to which the filter 2 is attached; and a sealing functional portion that provides sealing between the rib 32 and the flange 11 of the air intake duct 1 when the rib 32 is pressed against the sponge 4. Thus, a width dimension of the bezel 3 (i.e., a dimension for covering the edge of the opening portion at the air introduction side of the air intake duct 1) can be made small. As a result, a large opening area at the air introduction side (a large opening area of the duct opening portion) can be secured, and thus, sufficient air amount increase performance (i.e., sufficient performance of increasing an air amount) can be secured. Meanwhile, in the related art (see FIG. 4), the bezel "c" is locked to the garnish "d", and no special sealing structure is provided between these components "c", "d". Thus, the air that has flowed between the bezel "c" and the garnish "d" (the air that has not flowed through the filter "b") may be introduced into the air intake duct "a". However, in the embodiment, the extension portion 37 of the bezel 3 is pressed against the sponge 4 without providing the garnish between the extension portion 37 of the bezel 3 and the sponge 4. Thus, all the air to be introduced into the air intake duct 1 flows through the filter 2, and thus, sufficient air cleaning performance can be secured.

In addition, in the embodiment, in an operation of replacing the filter 2, the bezel 3 and the filter 2 are initially detached together from the floor member 7, and the filter 2 is detached from the locking projections 33 provided in the bezel 3. Thereafter, the locking projections 33 of the bezel 3 are locked to the openings 23 of the new filter 2, and the bezel 3, which is locked to the filter 2, is attached to the floor member 7. Thus, filter replacement function is maintained.

Next, a description will be provided on modified examples.

Figure 3A:
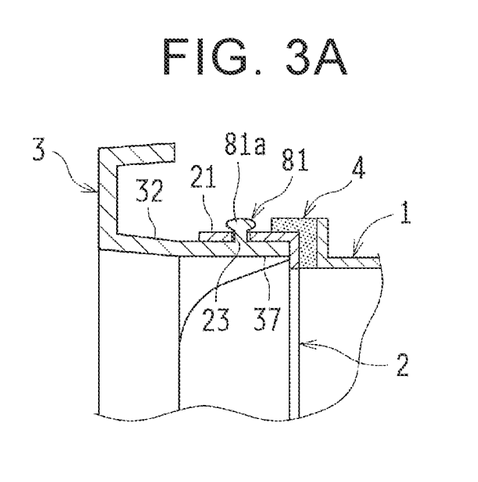
FIGS. 3A to 3E are enlarged views of main portions in modified examples.

FIG. 3A is an enlarged view of a main portion (an upper portion of the duct opening portion) in a first modified example. In FIG. 3A, instead of the locking projections 33 in the embodiment, locking pins (locking projections as the support portions in the disclosure) 81 are provided. Each of the locking pins 81 projects perpendicularly from the outer surface of the rib 32. Each of the locking pins 81 includes an enlarged diameter portion 81a at a distal end thereof. When each of the enlarged diameter portions 81a is fitted to the corresponding opening 23 that is provided in the frame 21 of the filter 2, the filter 2 is locked to the bezel 3. The rest of the structure is the same as that in the embodiment.

In the case of the modified example, the same effects as those in the above-described embodiment can be obtained.

Figure 3B:
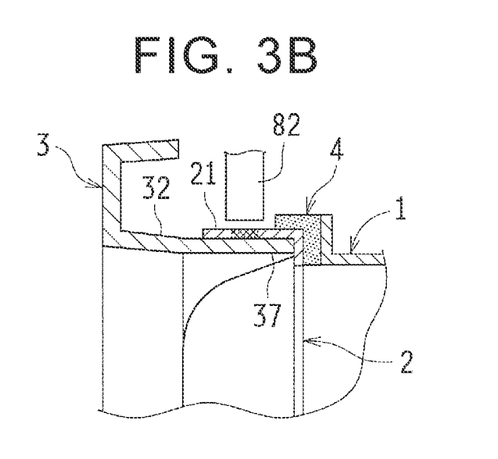

FIG. 3B is an enlarged view of a main portion in a second modified example. In FIG. 3B, the frame 21 of the filter 2 is welded to the outer surface of the rib 32. A reference numeral 82 in FIG. 3B denotes a heating tool that melts the frame 21 when the frame 21 of the filter 2 is welded to the outer surface of the rib 32.

Figure 3C:
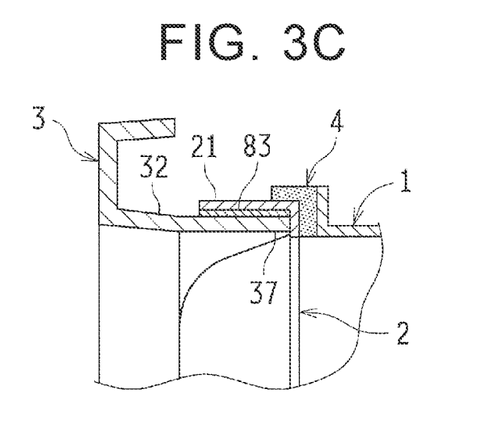

FIG. 3C is an enlarged view of a main portion in a third modified example. In FIG. 3C, the frame 21 of the filter 2 is stuck (i.e., bonded) to the outer surface of the rib 32 by a double-sided tape 83.

In the second modified example and third modified example, in the operation of replacing the filter 2, the filter 2 and the bezel 3 are replaced integrally (i.e., the filter 2 and the bezel 3 that are integrated with each other are replaced), and thus, the operation of detaching the bezel 3 from the filter 2 is no longer necessary. Thus, the replacement operation can be simplified.

Figure 3D:
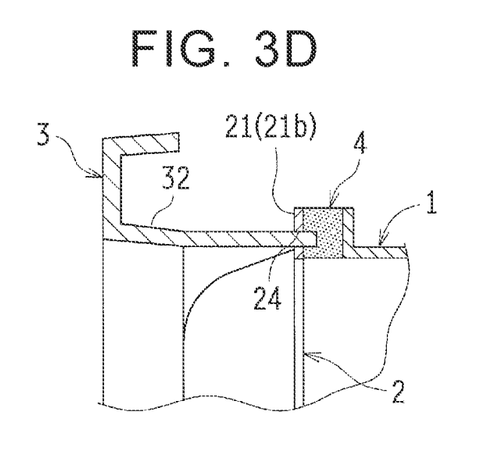

FIG. 3D is an enlarged view of a main portion in a fourth modified example. In FIG. 3D, the frame 21 of the filter 2 does not include the horizontal portion (the horizontal portion 21a in FIG. 2) and includes only the perpendicular portion 21b. The perpendicular portion 21b has an opening 24 that extends through the perpendicular portion 21b along the horizontal direction. Then, the distal end of the rib 32 of the bezel 3 is inserted through the opening 24 and is directly pressed against the sponge 4 without providing the filter 2 between the rib 32 of the bezel 3 and the sponge 4. That is, the rib 32 of the bezel 3 is directly pressed against the sponge 4, and the sponge 4 is partially deformed in the compressed direction. Thus, the sponge 4 provides sealing between the bezel 3 and the air intake duct 1 in the airtight manner.

In the case of the modified example, the distal end of the rib 32 of the bezel 3 and a portion in the vicinity of the distal end of the rib 32 may be regarded as the "support portion that supports the filter" and the "extension portion having a length that allows the extension portion to be directly pressed against the seal member" in the disclosure.

Figure 3E:
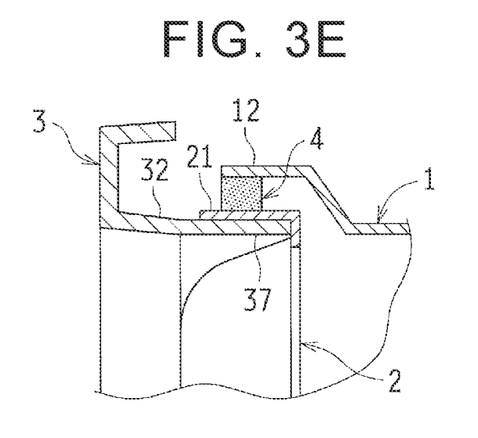

FIG. 3E is an enlarged view of a main portion in a fifth modified example. In FIG. 3E, a direction in which the extension portion 37 of the rib 32 of the bezel 3 is pressed against the sponge 4 is set to be a direction (the upward direction in FIG. 3E) that is orthogonal to an extending direction of the extension portion 37 (i.e., an extending direction in which the extension portion 37 extends).

More specifically, a horizontal portion 12 that extends along the substantially horizontal direction is provided at the end at the air introduction side of the air intake duct 1. In addition, both of a dimension (for example, a dimension in the up-down direction in FIG. 3E) of an outer edge of the rib 32 of the bezel 3 and the dimension (similarly, the dimension in the up-down direction in FIG. 3E) of the outer edge of the frame 21 of the filter 2 are set to be slightly larger than a dimension of an inner edge of the sponge 4 (i.e., a dimension of an inner edge of the sponge 4 in a state where the external force is not applied to the sponge 4) and slightly smaller than a dimension of an inner edge of the horizontal portion 12 of the air intake duct 1.

The extension portion 37 that is a distal end portion of the rib 32 of the bezel 3, and the filter 2 are inserted inside the horizontal portion 12 of the air intake duct 1, and the extension portion 37 and frame 21 of the filter 2 are pressed outward (upward in FIG. 3E) against the sponge 4. That is, the extension portion 37, which is the distal end portion of the rib 32 of the bezel 3, has the length that makes it possible to secure a sufficient overlapping amount by which the extension portion 37 overlaps with the sponge 4 (i.e., a sufficient overlapping amount for applying a pressing force to the sponge 4). The sponge 4 is compressed and deformed along the up-down direction by the pressing force from the extension portion 37. Thus, the sponge 4 provides sealing among the bezel 3, the filter 2, and the air intake duct 1 in the airtight manner.

FIG. 3E shows the structure in which the rib 32 of the bezel 3 and the frame 21 of the filter 2 are welded. However, as in the third modified example, the rib 32 of the bezel 3 and the frame 21 of the filter 2 may be stuck (i.e., bonded) to each other by the double-sided tape. That is, the fifth modified example shown in FIG. 3E can be applied to the structure in which the rib 32 of the bezel 3 and the frame 21 of the filter 2 are stuck to each other by the double-sided tape.

The disclosure is not limited to the above-described embodiment and the above-described modified examples. Various modifications and changes can be made to the embodiment and the modified examples within the scope of the disclosure.

For example, in the embodiment and the modified examples, the disclosure is applied as the duct opening portion structure configured to introduce air for cooling the battery provided in the electric vehicle. However, the disclosure is not limited thereto and can also be applied to a duct opening portion structure configured to introduce air for cooling an object to be cooled other than the battery.

The disclosure can be applied to the duct opening portion structure configured to introduce air for cooling the battery provided in the vehicle.

What is claimed is:

1. A duct opening portion structure that is configured to introduce air for cooling an in-vehicle object to be cooled, the duct opening portion structure comprising:
   an air intake duct;
   a filter that is disposed in an opening portion at an air introduction side of the air intake duct; and
   a bezel that is disposed in the opening portion at the air introduction side of the air intake duct, the bezel being configured to support the filter, wherein
   the bezel is attached to a vehicle body-side member, the bezel includes a rib in a shape of a frame, and the rib includes locking projections configured to support the filter,
   the locking projections are provided so as to project at positions at specified intervals in a circumferential direction of the rib on an outer surface of the rib that extends in a horizontal direction, each of the locking projections having a perpendicular portion that extends perpendicularly from the outer surface of the rib and a horizontal portion that extends from an outer end of the perpendicular portion toward a side opposite to the air intake duct,
   the filter includes a frame, openings being provided in a horizontal portion of the filter frame at positions each of which corresponds to the position at which a corresponding one of the locking projections is provided, and each of the locking projections being inserted in a corresponding one of the openings provided in the filter frame so that the filter is detachably locked to the locking projections in a state where the horizontal portion of the filter frame is in contact with the outer surface of the rib, and
   the rib is provided with an extension portion having a length that allows the extension portion to be indirectly pressed against a seal member provided at an edge of the opening portion via a perpendicular portion of the filter frame in a state where the bezel is attached to the vehicle body-side member, the perpendicular portion of the filter frame being continuous with the horizontal portion of the filter frame.

2. The duct opening portion structure according to claim 1, wherein the extension portion of the rib is indirectly pressed against the seal member in an extending direction in which the extension portion extends.

3. The duct opening portion structure according to claim 1, wherein the length of the extension portion is (i) longer than a clearance dimension between each of the locking projections and the seal member in a state before the seal member is deformed and (ii) shorter than a clearance dimension between each of the locking projections and the edge of the opening portion of the air intake duct in the state where the bezel is locked to the vehicle body-side member.

4. The duct opening portion structure according to claim 2, wherein the length of the extension portion is (i) longer than a clearance dimension between each of the locking projections and the seal member in a state before the seal member is deformed and (ii) shorter than a clearance dimension between each of the locking projections and the edge of the opening portion of the air intake duct in the state where the bezel is locked to the vehicle body-side member.

* * * * *